(12) United States Patent
Moriwaki (10) Patent No.: US 7,263,221 B1
(45) Date of Patent: Aug. 28, 2007

(54) IMAGE PROCESSING FOR IMAGE CORRECTION

(75) Inventor: Kagumi Moriwaki, Itami (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 968 days.

(21) Appl. No.: 09/599,598

(22) Filed: Jun. 23, 2000

(30) Foreign Application Priority Data

Jun. 25, 1999 (JP) .................................. 11-180460

(51) Int. Cl.
*G06K 9/00* (2006.01)
(52) U.S. Cl. ...................................................... 382/167
(58) Field of Classification Search ........ 382/162–167, 382/274–275, 100; 358/500–540, 449, 464, 358/1.9; 395/589–610; 348/333.01, 333.05, 348/221.1, 218.1, 229.1, 603–622; 345/58, 345/690, 589; 388/500–540, 468, 1.9; 715/516, 715/70, 722–723
See application file for complete search history.

(56) References Cited

U.S. PATENT DOCUMENTS

| | | | | |
|---|---|---|---|---|
| 5,012,333 A | * | 4/1991 | Lee et al. ................... | 358/520 |
| 5,255,083 A | * | 10/1993 | Capitant et al. ............ | 358/527 |
| 5,283,671 A | * | 2/1994 | Stewar et al. .............. | 358/532 |
| 5,506,946 A | * | 4/1996 | Bar et al. ................... | 345/600 |
| 5,704,021 A | * | 12/1997 | Smith et al. ................ | 358/518 |
| 5,874,988 A | * | 2/1999 | Gu ............................. | 382/167 |
| 5,940,530 A | * | 8/1999 | Fukushima et al. ......... | 382/164 |
| 5,995,986 A | | 11/1999 | Ueda et al. | |
| 6,040,927 A | * | 3/2000 | Winter et al. ............... | 358/534 |
| 6,058,207 A | * | 5/2000 | Tujin et al. ................. | 382/162 |
| 6,058,208 A | * | 5/2000 | Ikeda et al. ................. | 382/167 |
| 6,097,836 A | * | 8/2000 | Inoue ......................... | 382/167 |
| 6,690,424 B1 | * | 2/2004 | Hanagata et al. ........... | 348/364 |

FOREIGN PATENT DOCUMENTS

| | | |
|---|---|---|
| JP | 6-292008 | 10/1994 |
| JP | 07147641 | 6/1995 |
| JP | 071476541 | 6/1995 |
| JP | 7-203230 | 8/1995 |
| JP | 9-163167 | 6/1997 |
| JP | 9-231039 | 9/1997 |
| JP | 10233934 | 9/1998 |

OTHER PUBLICATIONS

Japanese Office Action, with English-language translation, dated May 22, 2007.

* cited by examiner

*Primary Examiner*—Ishrat Sherali (57) ABSTRACT

In the processing of image data, image data are analyzed to determine a characteristic of the image, and the characteristic and a first correction parameter in correspondence to the characteristic are displayed in a screen of a display device. A second correction parameter may be set in the screen of the display device by a user. The image data is corrected with the first correction parameter, but when the user sets a second correction parameter, the image data are corrected with the second correction parameter. Alternatively, The image data are corrected automatically with the first correction parameter, and the characteristic of the image data is displayed in a screen after the image data have been corrected.

14 Claims, 10 Drawing Sheets

IMAGE PROCESSING FOR IMAGE CORRECTION

This application is based on application No. 11-180460 filed in Japan, the contents of which are hereby incorporated by reference.

BACKGROUND OF THE INVENTION

1. Field of the Invention

The present invention relates to image correction of color image.

2. Description of Prior Art

As to digital image data, especially color digital image data, various types of correction are performed on input image data. It is known that after digital image data are analyzed, the analysis result is presented in a user interface and that parameters for image processing are inputted by a user. For example, in an image processing described in Japanese Patent laid open Publication 10-233934/1998, color attributes (value, chroma and hue) of a color in an object image are analyzed, and they are adjusted in an interactive way. For example, value information is analyzed, and the analysis result is displayed as a histogram of value. Then, an operator instructs to increase or decrease the value by referring to the graphic presentation. Then, image correction is performed by using the instructed parameters. For example, the histogram is expanded to adjust the image according to the analysis results.

However, for a general user, it is difficult to set parameters of color attributes for image correction or to correct the parameters when an unsatisfactory correction result is obtained. For example, for an image having color fog, it is difficult to set parameters in correspondence to the color fog. Therefore, it is favorable to easily reflect user's wish in image correction.

SUMMARY OF THE INVENTION

An object of the present invention is to allow a user correct image data easily according to results of image analysis.

In one aspect of the invention, in the image processing, a controller analyzes image data to determine a characteristic thereof, and corrects the image data with the first correction parameter, and a display device displays the characteristic of the image data and a first correction parameter in correspondence to the characteristic in a screen. A user can instruct with an instruction device to set a second correction parameter in the screen. The controller corrects the image data with the second correction parameter when the user sets the second correction parameter.

In another aspect of the invention, in the image processing, a controller analyzes image data to determine a characteristic thereof and corrects the image data automatically with a correction parameter in correspondence to the characteristic of the image data. A display device displays the characteristic of the image data obtained by the controller in a screen after the image data is corrected by the controller. If a user is not satisfied with the result, a user can change the image correction with reference to the characteristic of the image presented in the screen.

An advantage of the present invention is that automatic image correction becomes more successful.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
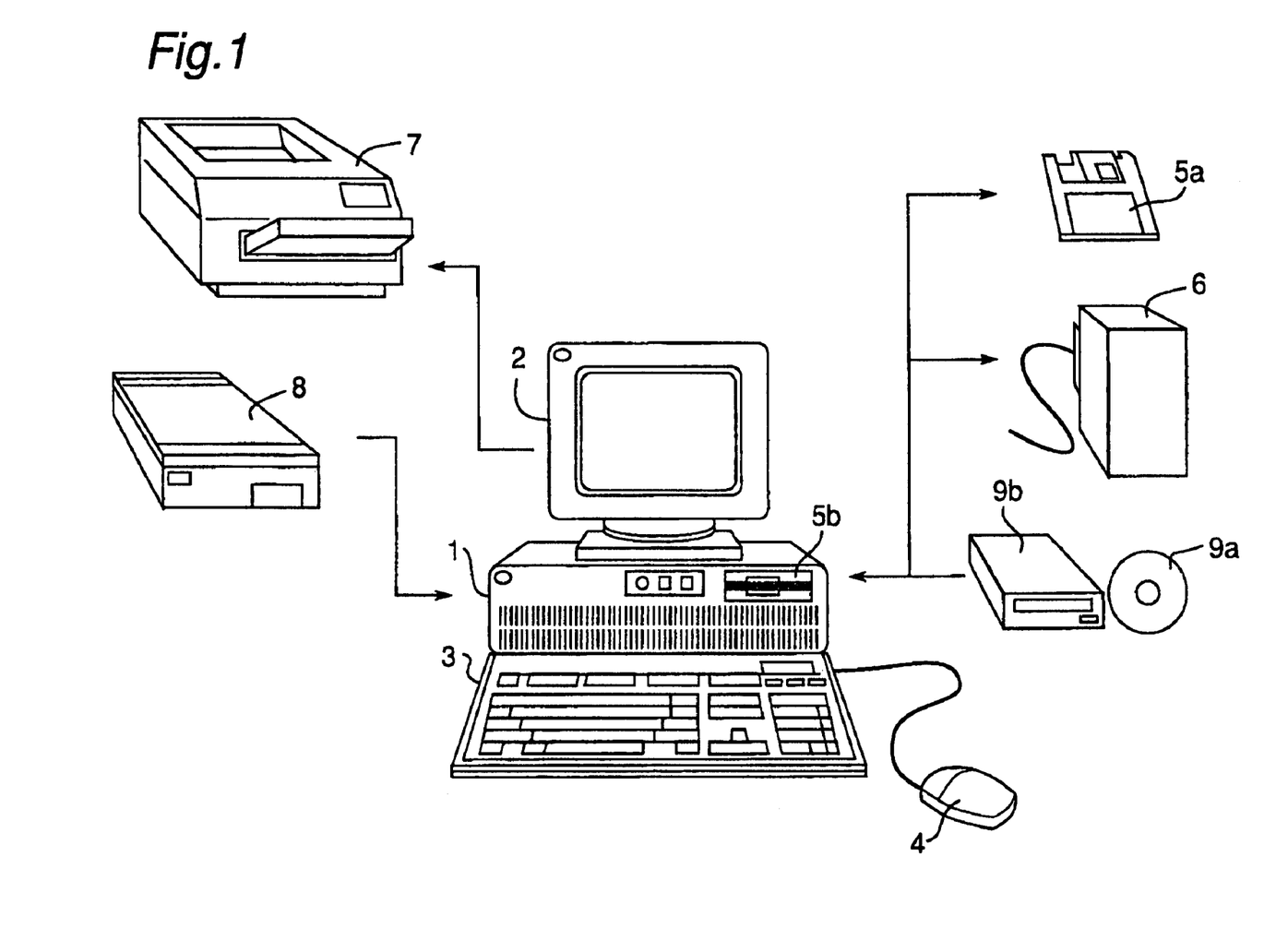
FIG. 1 is a diagram of an entire image processor.

Referring now to the drawings, wherein like reference characters designate like or corresponding parts throughout the several views, FIG. 1 shows an entire image processing apparatus according to a first embodiment of the invention. It has a controller (computer) 1 which controls the entire apparatus, as a central component. In FIG. 1, arrows show directions of data flow. A display device 2 displays various screens provided for operation or image processing as well as an image or characters in a screen. A keyboard 3 and a mouse 4 are used for various inputs and instructions by a user. A flexible disk 5 and a hard disk 6 are storage media for storing, for example, image data, attribute information and programs. The apparatus has a flexible disk drive and a hard disk drive for accessing the flexible disk 5 and the hard disk 6. A printer 7 prints image data or the like on a paper. A scanner 8 reads image data of a document. A CD-ROM 9 is a recording medium for storing various data or programs, and the apparatus has a CD-ROM drive for accessing the CD-ROM 9. Programs explained later are read from an external recording medium such as a CD-ROM.

Figure 2:
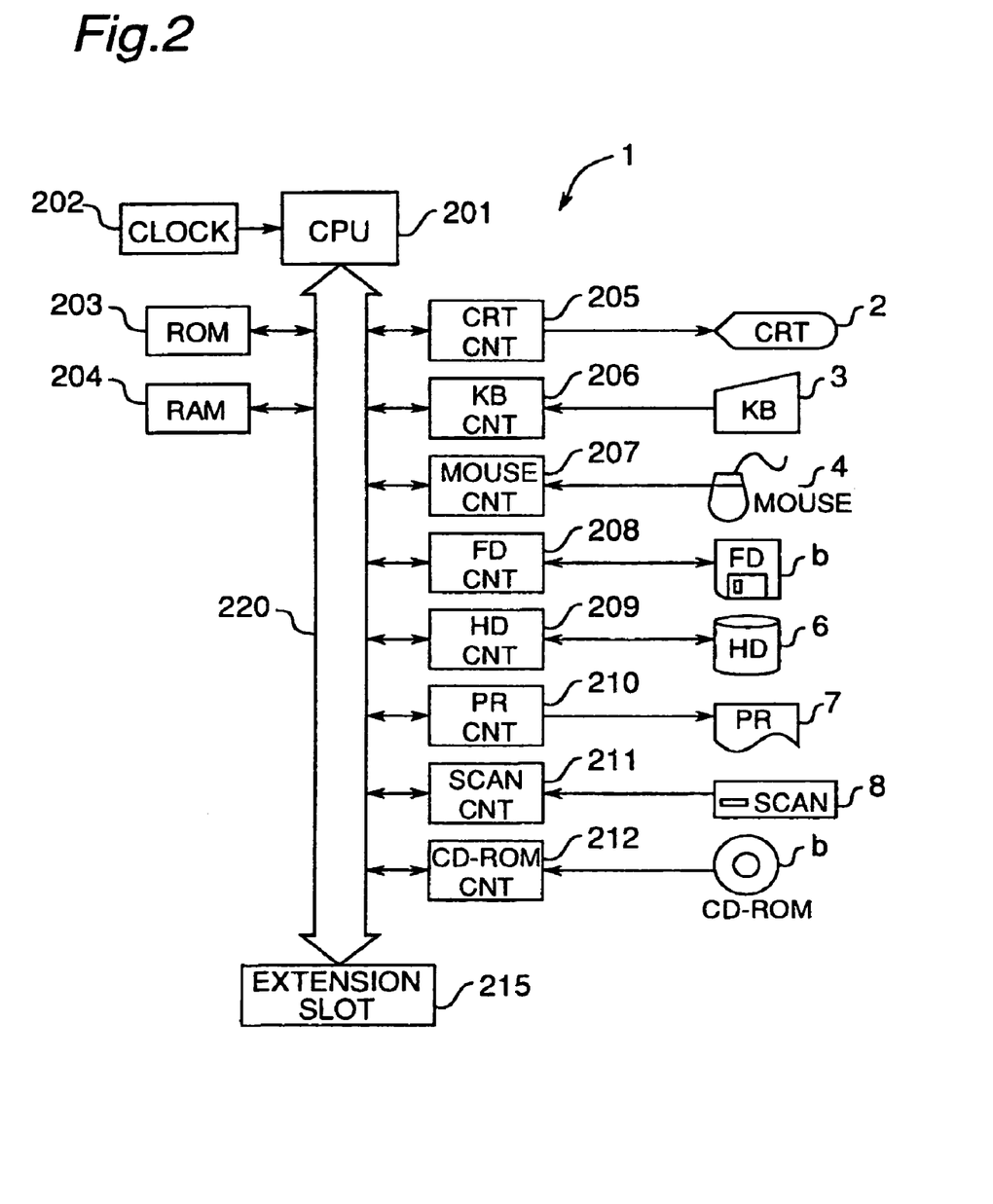
FIG. 2 is a block diagram of a controller and thereabout.

FIG. 2 is a block diagram of the controller 1 and thereabout. The controller 1 has a central processing unit (CPU) 210, and it is connected via a bus 220 to a read-only-memory (ROM) 203 for storing various data and a random access memory (RAM) for storing various data and programs. Further, it is also connected via the bus 220 to a display controller 205 for displaying images and characters in a screen of the display apparatus 2, a keyboard controller 206 for controlling key-input from the keyboard 3, a mouse controller for controlling an input from the mouse 4, a flexible disk controller 208 which controls the flexible disk drive, a hard disk controller 209 for controlling the hard disk 6, a printer controller 210 which controls outputs to the printer 7, a scanner controller 211 which controls the scanner 8, and a CD-ROM drive controller 212 which controls the CD-ROM drive. Further, in the controller, a clock circuit 202 generates various clock signals for operating the apparatus. Further, extension slots 215 are connected to the bus for connecting various extension boards to which for example a SCSI board is connected for connecting a flexible disk drive, a hard disk drive, a scanner, a CD-ROM drive or the like. Further, it is also connected via an interface card to a network (web). In this apparatus, the flexible disk 5 and the hard disk 6 are used as storage media, but other medium such as a magneto-optical disk may also be used. The scanner 8 and the CD-ROM 9 are used for inputting image data, but another input devise such as a still video camera may also be used. The printer 7 is used as an output device, but a digital copying machine or the like may also be used.

In this apparatus, image data are corrected in an image correction routine which includes presentation of image analysis result. When start of image correction is instructed by a user, the routine is evoked. The image correction routine further includes image file input/output processing, image data display processing, a graphic user interface processing for image correction operation, error processing in the graphic user interface processing, and resolution change processing, but they are not explained here. The structures of the image processing apparatus shown in FIGS. 1 and 2 are common in other embodiments which will be explained later.

Presentation of image analysis result in image correction is explained below. In this processing, image data is analyzed, and the analysis result thereof is displayed in a screen of the display device 2 to inform a correction parameter on image correction to a user while setting the correction parameter based on the analysis.

Next, a first embodiment of the invention is explained. In this embodiment, image analysis result (characteristics of image) is displayed and a user can set a different correction parameter on the image.

Figure 3:
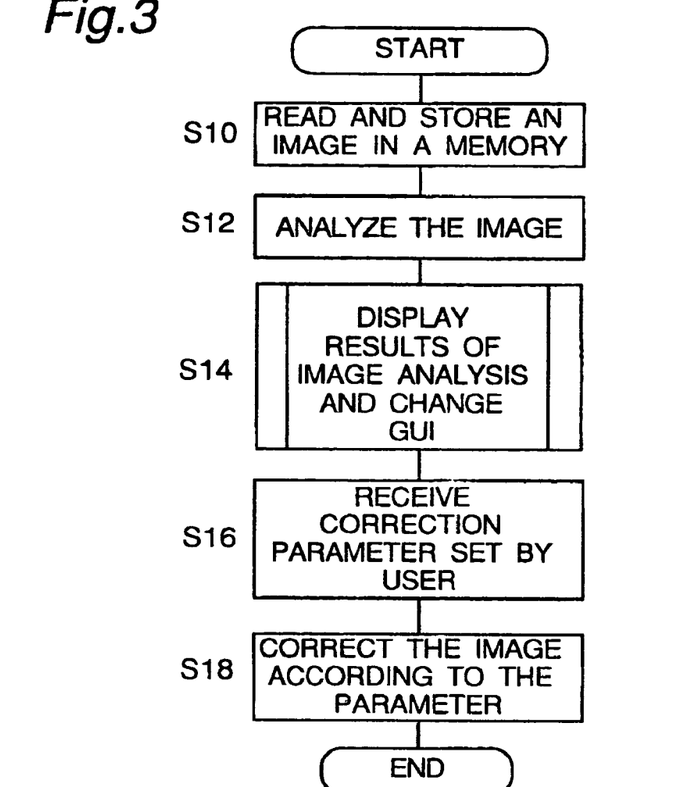
FIG. 3 is a main flowchart in a first embodiment of the invention.

FIG. 3 shows a main flowchart of image correction. First, image data obtained by the scanner 8 is received and stored in a memory (step S10), and the image data is analyzed (step S12). In the analysis, histograms of R, G, B data, value data or the like are prepared, and image data are divided into areas. A scene such as color fog, backlight, underexposure, overexposure, night scene or the like is decided. Next, the image analysis result is displayed in the screen of the display apparatus 2 and the graphic user interface (GUI) is changed (step S14, refer to FIG. 6). Next, a correction parameter may be inputted by a user (step S16). The correction parameter such as "weak color fog" or "backlight" is determined beforehand in correspondence to the characteristic of the image obtained by the image analysis. A user observes the image analysis result and the recommended correction parameter in the screen and changes the correction parameter if necessary. The "correction parameter" which a user sets or changes is not a correction parameter on color components, but a correction parameter represented in the screen with a sentence, such as "correct color fog weakly" or "correct backlight". The image processor interprets the correction parameter as parameters for color processing operation for "correct color fog weakly" or "correct backlight", and corrects the image with the parameters. Next, image correction is performed with the input correction parameter (step S18). For example, color fog is deleted.

Figure 4:
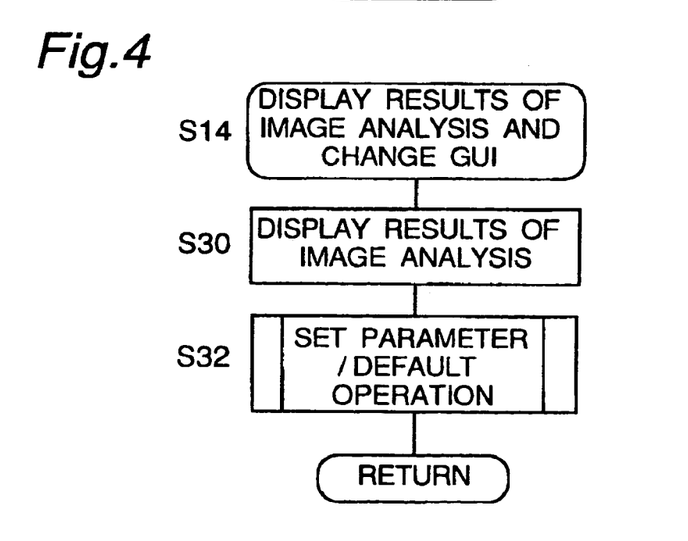
FIG. 4 is a flowchart of changing a graphic user interface while displaying image analysis results.

FIG. 4 shows a flowchart of changing a graphic user interface while displaying the image analysis result. First, the image analysis result is displayed in the screen (step S30). That is, a scene decided as a result of image analysis is displayed. For example, a scene where "weak color fog exists" is displayed. Next, a parameter and an operation for the scene of the analysis result are set (step S32). As an example of the processing, parameter setting for color fog correction is explained with reference to FIGS. 5 and 6.

Figure 5:
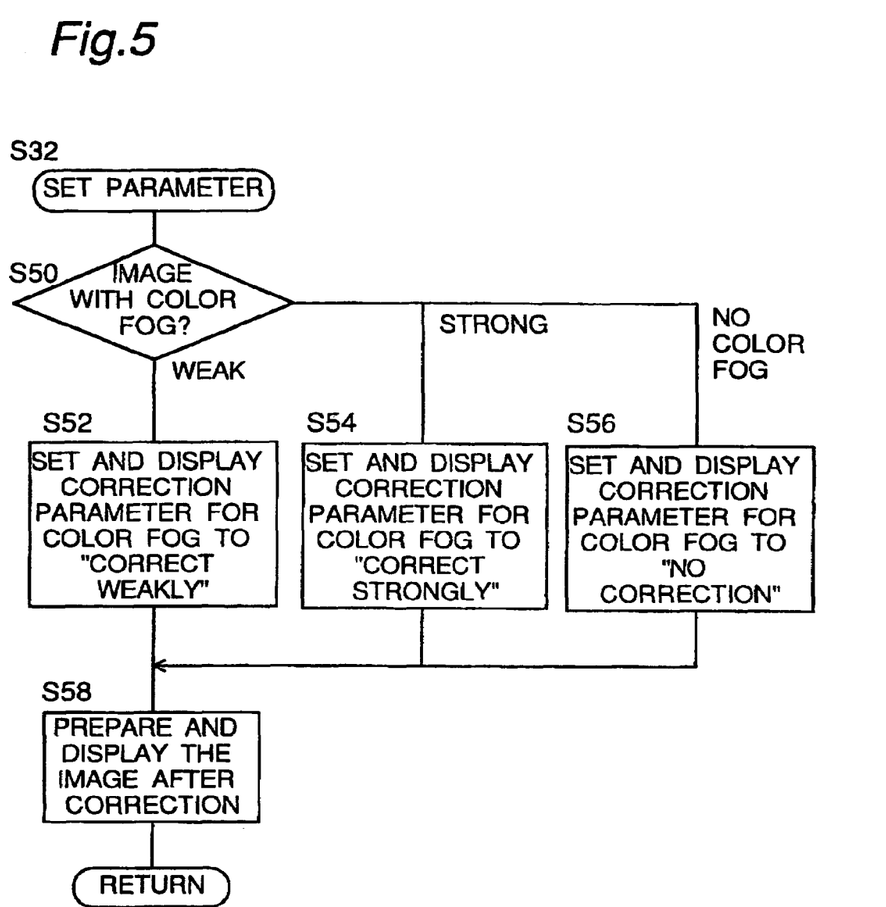
FIG. 5 is a flowchart of parameter setting.

FIG. 5 is a flowchart of parameter setting for color fog correction (step S32 in FIG. 4). The flow branches according to the analysis result of color fog image (refer to step S12 in FIG. 3) (step S50). When weak color fog is detected, the correction parameter is set to "correct weakly" and it is displayed in the screen (step S52). When strong color fog is detected, the correction parameter is set to "correct strongly" and it is displayed in the screen (step S54). When no color fog is detected, the correction parameter is set to "no correction" and it is displayed in the screen (step S56). Next, the image is subjected to image correction, and the image after correction is displayed in the screen (step S58). Thus, a preview image after correction with the parameter are displayed in the screen.

Figure 6:
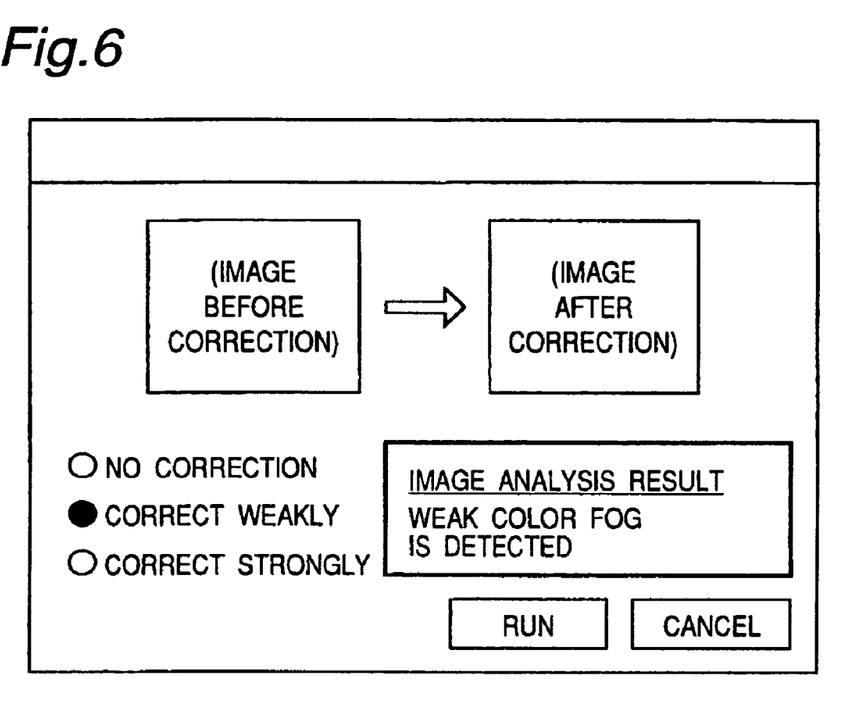
FIG. 6 is a diagram of window presentation for setting parameters.

FIG. 6 shows an example of a screen (window) in the display apparatus 2 for setting the parameter in color fog correction. At the lower left side, three color fog parameters ("No correction", "Correct weakly" and "Correct strongly") are presented. In this example, weak color fog is detected. Therefore, a mark in correspondence to "Correct weakly" is selected as the parameter, and a sentence therefor is displayed at the lower right side. Further, an image before correction is displayed at the upper left side, while an image subjected to weak color fog correction (preview image) is displayed at the upper right side. By observing the screen, a user can understand the image analysis result and the recommended parameter and can operate the correction only by clicking "RUN" button. If a user does not satisfy the analysis result by observing the preview image, he can press "CANCEL" button to change the parameter. For example, if the correction is insufficient, the value for the insufficient parameter may be changed according to the analysis result.

Figure 7:
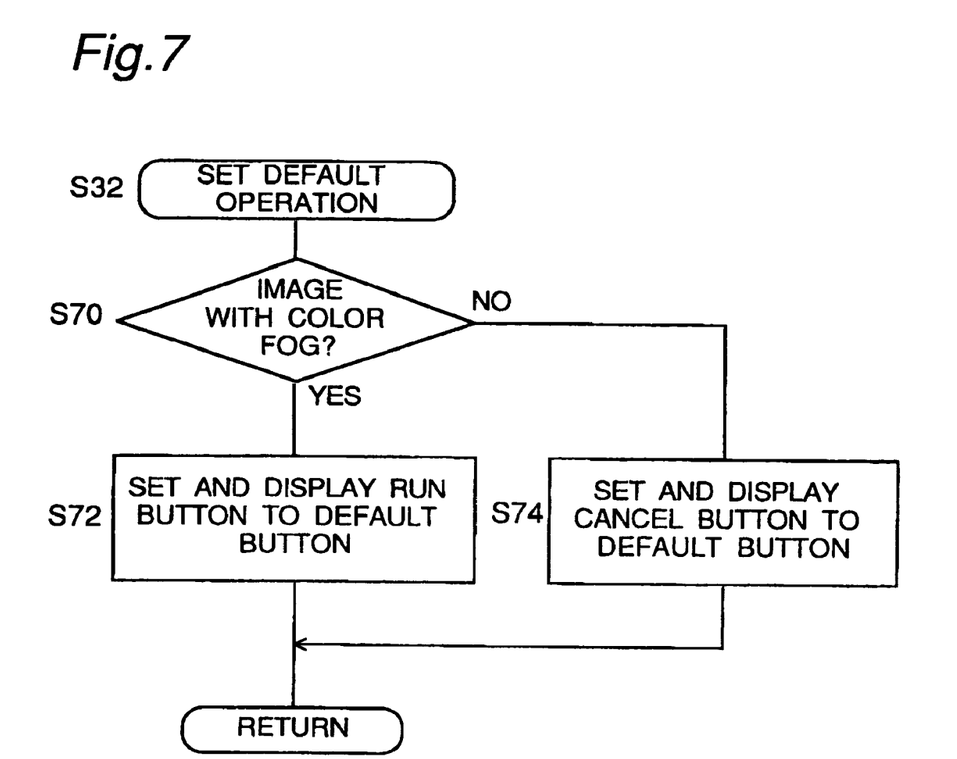
FIG. 7 is a flowchart of default operation.

FIG. 7 is a flowchart of default operation for color fog correction (step S32 in FIG. 4). When color fog is detected (YES at step S70), "RUN" button is displayed as a default button in the screen (step S72). On the other hand, When color fog is not detected (NO at step S70), "CANCEL" button is displayed as a default button in the screen (step S74).

Figure 8:
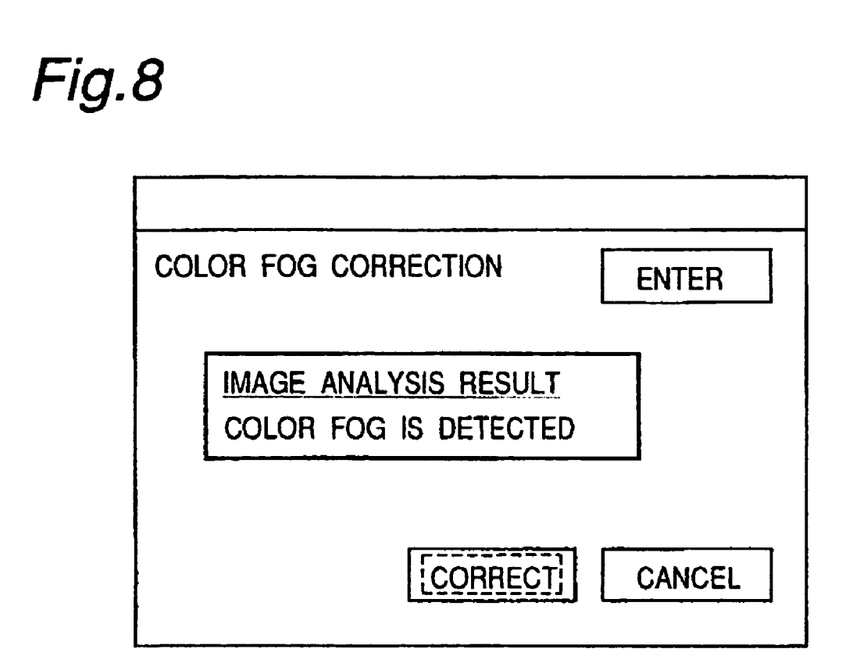
FIG. 8 is a diagram of window presentation for setting operation on color fog correction.

FIG. 8 shows an example of a screen (window) in the display apparatus 2 for setting default operation on color fog correction. In this example, weak color fog is detected, and "CORRECT" button is recommended as the default button. When the correction is performed, a user can understand the image analysis result and operate only by pressing "ENTER" key.

Figure 9:
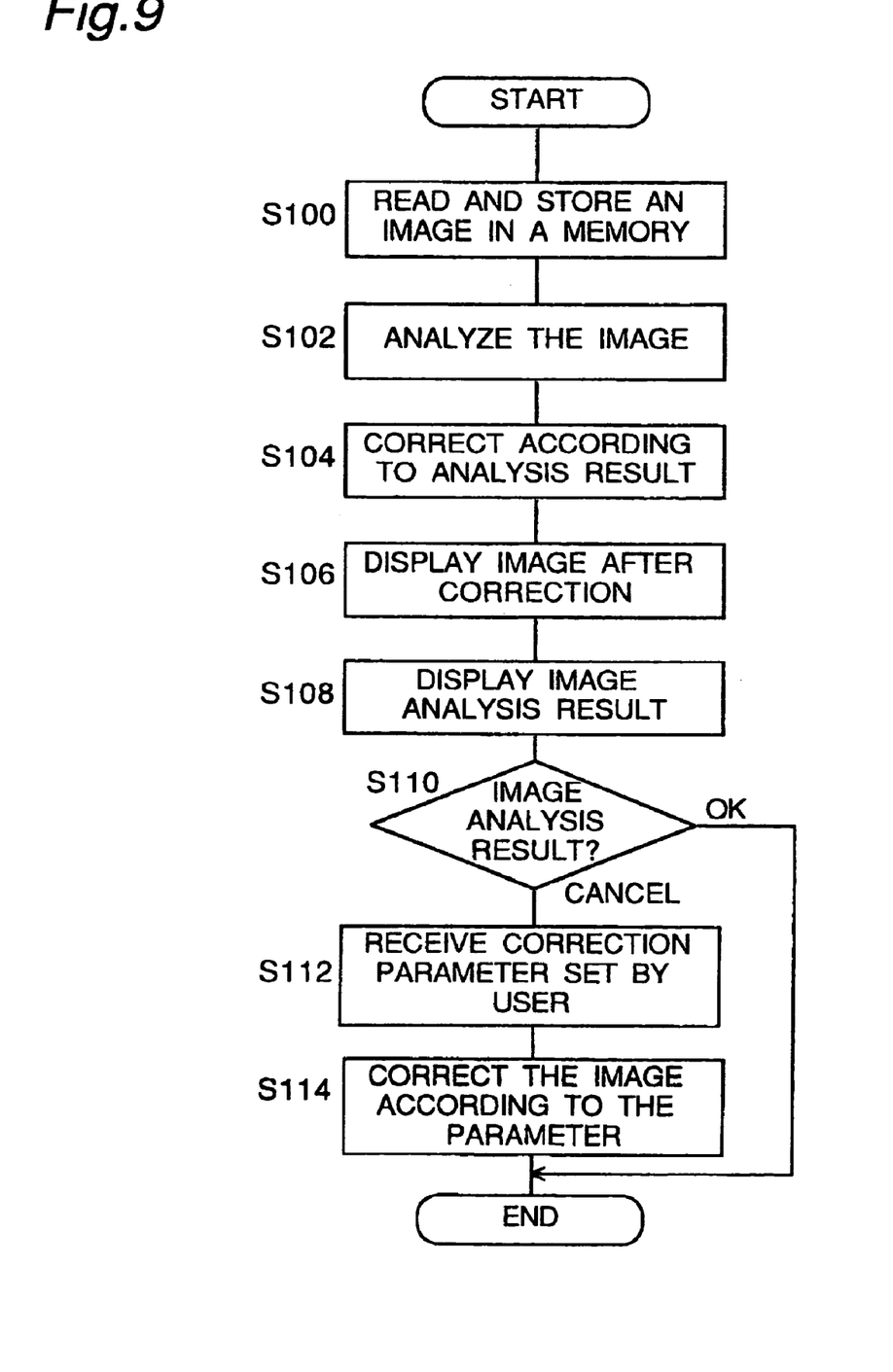
FIG. 9 is a main flowchart in a second embodiment of the invention.

Next a second embodiment of the invention is explained. In this embodiment, the image analysis result is explained after the automatic correction. FIG. 9 is a main flowchart of this embodiment. First, an image is read and stored in a memory (step S100), and it is analyzed (step S102). Similarly to the first embodiment, histograms of R, G, B data, value data or the like are prepared, and image data are divided into areas. Then, a scene such as color fog, backlight, underexposure, overexposure, night scene or the like is decided. Image correction is performed based on image analysis result (step S104), wherein the parameter is adjusted automatically according to the analysis result of step S102 and image correction is performed with the parameter (step 5106). Next, an image after the correction is displayed (step S106), and the image analysis result is also displayed (step S108). If a user does not satisfy the image after correction (NO at step S110), he adjusts the parameter based on to the analysis result (step S112), and the image is corrected again (step S114).

Figure 10:
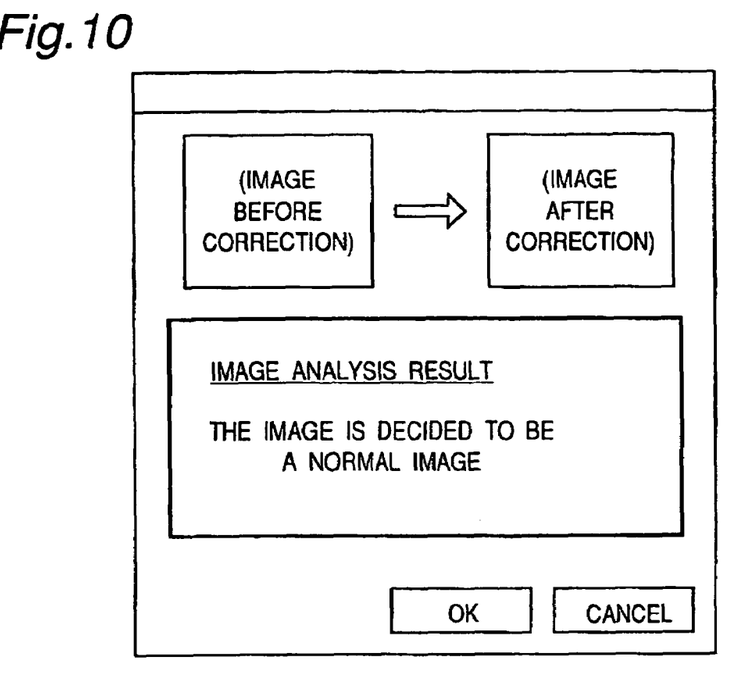
FIG. 10 is a diagram of a window presentation when a backlight image is decided as a normal image and corrected automatically.

FIG. 10 shows an example of a screen (window) of the display apparatus when a backlight image is decided erroneously as a normal image and corrected automatically. It is understood from the screen that the image is decided as a normal image, and this means that the image is corrected with the parameter for normal correction. If this automatic correction is different from user's intention, the user can understand the cause thereof. Therefore, it is understood easily how the parameter is set for obtaining the intended image. Further, a satisfactory result can be obtained simply by changing the parameter. In this case, a user does not satisfy the analysis result because the image is an image under backlight.

Figure 11:
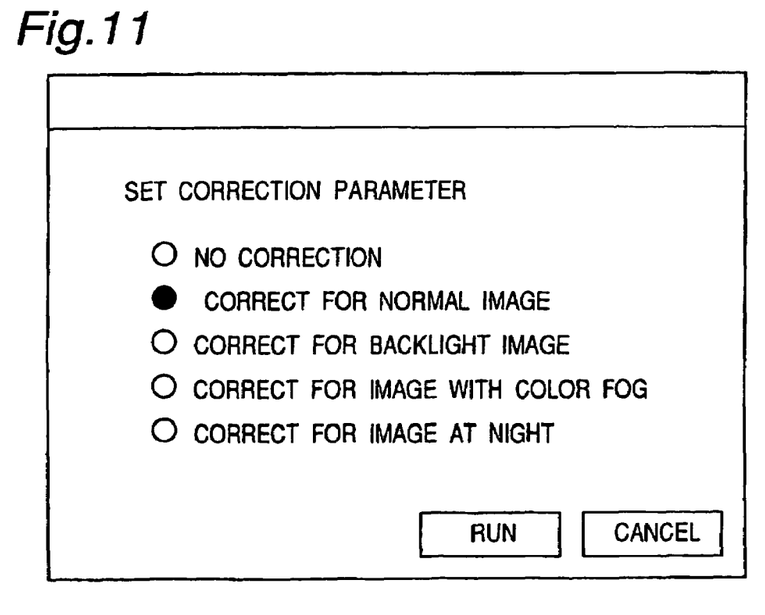
FIG. 11 is a diagram of an example of window presentation for setting parameters.
Figure 12:
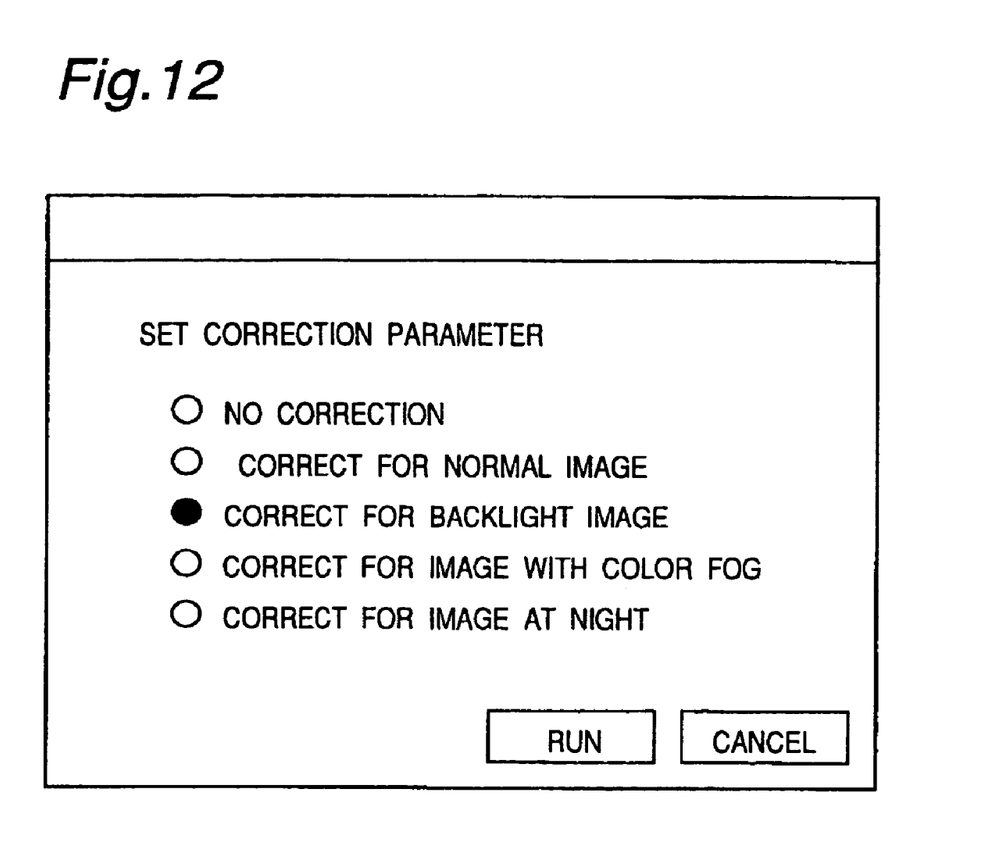
FIG. 12 is a diagram of another example of window presentation for setting parameters.

Then, a user presses the cancel button shown in FIG. 10, to cancel the correction. Next, the correction parameter is changed, and execution of correction is instructed. By referring to screens (windows) of the display apparatus 2 for setting parameters shown in FIGS. 11 and 12, steps in FIG. 10 for changing the correction parameter and executing image correction are explained. FIGS. 11 and 12 show that four types of correction parameter of normal, backlight, color fog and night scene can be set. Further, FIG. 11 shows that the default value of the correction parameter is set to "CORRECT FOR NORMAL IMAGE" according to the analysis result. However, a user does not satisfy the analysis result and sets "CORRECT FOR BACKLIGHT IMAGE" as correction parameter and presses "RUN" button to performed desired correction. FIG. 12 shows that "CORRECT FOR BACKLIGHT IMAGE" is selected as correction parameter.

As explained above, the image analysis result is displayed in the screen, it helps a user to understand how to change the correction parameter when a desired image is not obtained due to erroneous decision of the scene or the like and the correction parameter on the image is changed manually. Even a beginner can understand easily what parameter has to be set.

For example, in the above example, it is decided that the image has weak color fog, and a button for color fog deletion is set in an enabled state. Further, there are three correction parameters of NO, WEAK and STRONG on color fog deletion, and "WEAK" is set in a selected state.

As in the example in the second embodiment, when a backlight image is dealt as a normal image, the correction parameter of "CORRECT FOR NORMAL IMAGE" is displayed. Then, a user presses the cancel button to clear the correction result, and sets the parameter for correction on backlight image.

In the above-mentioned embodiments, RGB image is processed. However, the above processing is applicable not only to RGB image, but also to Bayer image dealt in a digital camera.

It is an advantage that correction parameter is displayed besides the image analysis result, a user can operate image correction without inputting correction parameter. Even a beginner can understand easily what correction parameter has to be set. It is helpful to determine how to change the correction parameter when a desired image is not obtained due to erroneous decision of scene or the like and correction parameter is corrected manually. When a user performs desired correction, it is understood what correction parameter is changed. For example, when correction is insufficient, an insufficient parameter is increased relative to the analysis result.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processor comprising:
    a controller which analyzes image data to determine a scene thereof and a first correction parameter that corresponds to the scene;
    a display device which displays a) the scene of the image data obtained by said controller, b) the first correction parameter obtained by said controller in a selected condition and c) a second correction parameter that corresponds to the determined scene of the image data but differs from the first correction parameter in a screen; and
    an instruction device by which a user enters an instruction to select one of the first and second correction parameters in the screen of said display device;
    wherein said controller corrects the image data with the selected correction parameter.

2. The image processor according to claim 1, wherein said instruction device sets the first correction parameter obtained by said controller as a default correction parameter.

3. The image processor according to claim 1, wherein said display device displays the first correction parameter that corresponds to the determined scene and alternative correction parameters that do not correspond to the determined scene of the image data.

4. The image processor according to claim 1, wherein said display device further displays an image which has been corrected by said controller with the first correction parameter.

5. An image processing method comprising the steps of:
    analyzing image data to automatically determine a scene of the image data;
    displaying the scene of the image data, a first correction parameter that corresponds to the determined scene and a second correction parameter that differs from the first correction parameter;
    selecting one of the first and second correction parameters by a user; and
    correcting the image data with the first correction parameter or with the second correction parameter based upon the user selection.

6. A computer readable storage medium storing a program that executes the steps of:
    analyzing image data to automatically determine a scene thereof;
    displaying the scene of the image data, a first correction parameter that corresponds to the determined scene, and a second correction parameter that differs from the first correction parameter;
    receiving an instruction from a user to select one of the first and second correction parameters; and
    correcting the image data with the first correction parameter or with the second correction parameter when the user enters an instruction to select the correction parameter.

7. The computer readable storage medium according to claim 6, said program further executing the step of setting the first correction parameter as a default correction parameter.

8. The computer readable storage medium according to claim 6, wherein in said displaying step, the first correction parameter that corresponds to the scene and correction parameters that do not correspond to the scene are displayed in the screen.

9. The computer readable storage medium according to claim 6, wherein in said displaying step, an image which has been corrected during said correcting step is also displayed.

10. An image processor comprising:
- an analyzer which analyzes image data to determine a scene thereof;
- a decider which decides a first image correction process based on the determined scene;
- a display device which displays the scene to a user, the first correction process and a second correction process that differs from the first correction process; and
- a setter which receives a user's instruction to select the first image correction process or the second correction process and sets the selected image correction process to perform the correction of the image data.

11. The image processor of claim 1, wherein a scene determined by said controller is at least one of color fog, backlight, underexposure, overexposure, night scene and normal.

12. The image processing method of claim 5, wherein a scene determined in said step of analyzing image data is at least one of color fog, backlight, underexposure, overexposure, night scene and normal.

13. The computer readable storage medium according to claim 6, wherein a scene determined in said step of analyzing image data is at least one of color fog, backlight, underexposure, overexposure, night scene and normal.

14. The image processor according to claim 10, wherein a scene determined by said analyzer is at least one of color fog, backlight, underexposure, overexposure, night scene and normal.

* * * * *